Dec. 27, 1938.            J. L. FERGUSON            2,141,296
                            WEIGHING MACHINE
                            Filed April 4, 1935
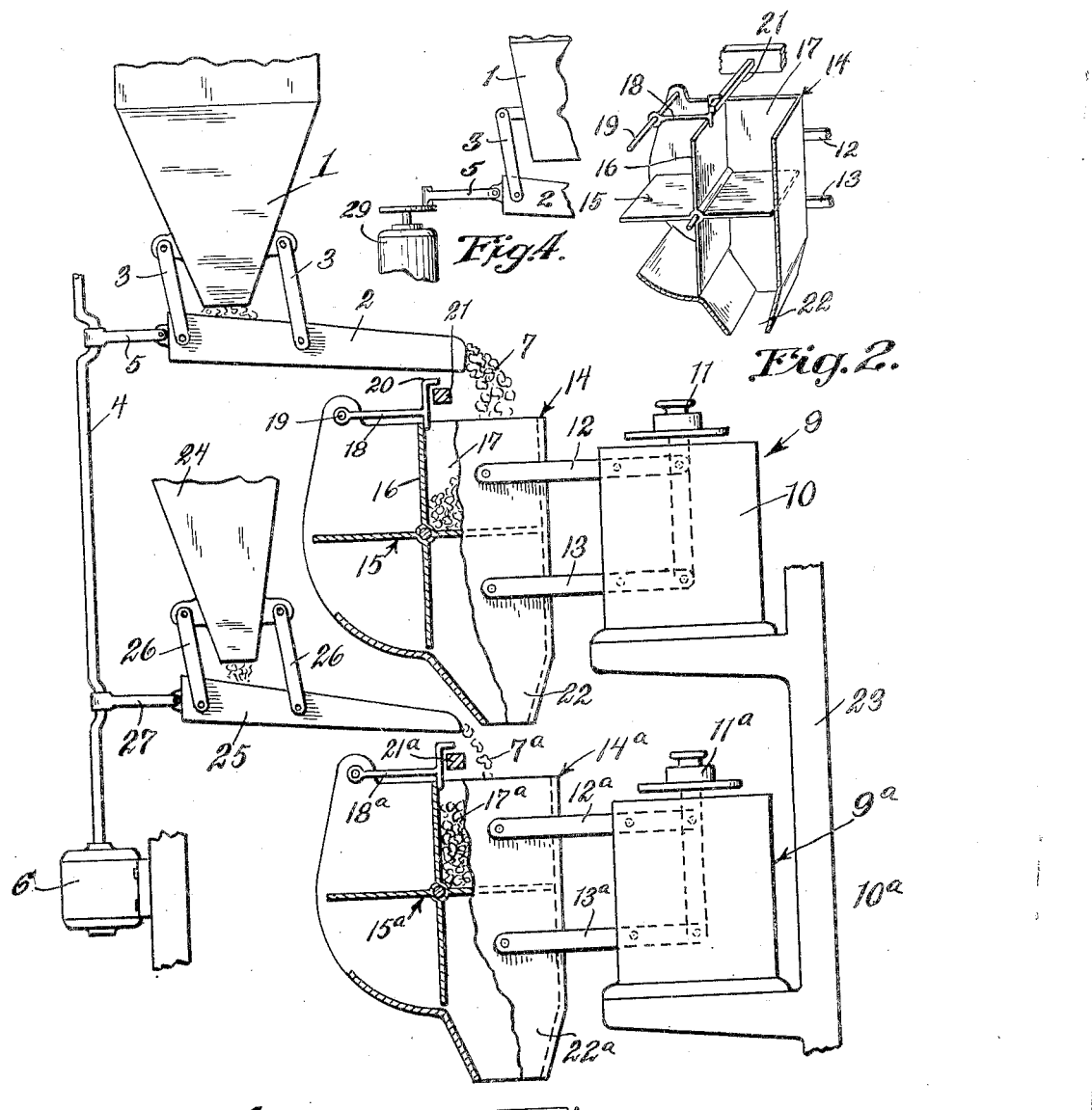
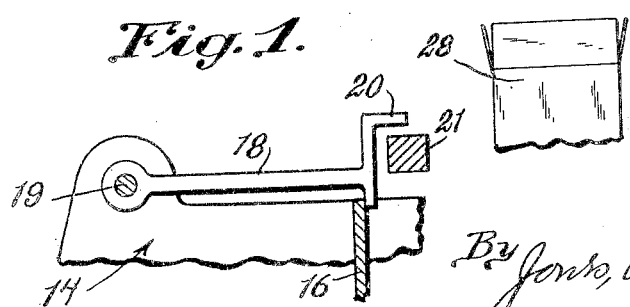

Patented Dec. 27, 1938

2,141,296

UNITED STATES PATENT OFFICE 2,141,296

WEIGHING MACHINE

John L. Ferguson, Joliet, Ill., assignor to J. L. Ferguson Company, Chicago, Ill., a corporation of Illinois Application April 4, 1935, Serial No. 14,580

9 Claims. (Cl. 249—19)

This invention relates to weighing machines and more particularly to machines for weighing cereal flakes and similar material in which it is desired that consecutively small quantities of material be accurately weighed and delivered into the usual containers for retail distribution.

In packaging cereal flakes and the like it is desirable that each package contain an accurately predetermined weight of material. It is also desirable that the individual flakes or units of the prepared material should not be crushed or otherwise distorted, but should be delivered to the package in the same condition as when first manufactured.

An attempt has been made to package material such as cereal flakes according to predetermined bulk. However, this has been unsatisfactory as the weight varies considerably relative to the bulk. Therefore, packaging machines have heretofore been used in which a stream of material being delivered to the weighing device was cut off by means of a sliding gate or similar device. Such structures, however, have resulted in crushing a considerable amount of the material and have been unsatisfactory for that and other reasons.

The present invention provides a weighing machine wherein cereal flakes and the like may be accurately and automatically weighed and successive packages may each be filled with a substantially accurate predetermined amount-by-weight of material.

It is an object of the present invention to provide a weighing device in which predetermined amounts-by-weight of material may be continuously segregated from the bulk of the material and delivered to consecutively positioned packages without crushing or otherwise damaging the material.

A further object is the provision of a weighing machine which will automatically and accurately weigh material such as corn flakes without crushing, and in which the amount-by-weight may be accurately varied to conform to the size of the packages to which the material is delivered.

The invention provides an automatic weighing machine for delivering predetermined amounts of accurately weighed material in which a relatively large continuous flow of the material may be supplied to the device, and accurate consecutive amounts-by-weight may be delivered therefrom without crushing the material.

The invention provides an efficient device for weighing material, particularly such as cereal flakes, wherein approximate weights of material may be passed from a supply thereof to consecutive weighing devices and small additional amounts added during a final weighing operation to provide an accurate ultimate predetermined weight.

The invention contemplates a weighing assembly having a plurality of weight responsive means arranged to advance a progressively increasing weight of material in a manner to deliver a predetermined ultimate weight.

It is also an object to provide a weighing device which may be entirely automatic in operation and may accurately segregate predetermined amounts-by-weight of material from a continuously delivered supply by a plurality of consecutive weighing operations. Also, whereby the accurately weighed material may be automatically delivered to consecutively positioned cartons.

The invention also contemplates a weighing machine which will be of few parts, without complicated mechanisms and in which the weighing devices may operate independently of any controlling or operating mechanism.

Further objects will be apparent from the specification and the appended claims.

In the drawing:

Figure 1 is a somewhat diagrammatic side elevation of one embodiment of the invention, a portion being broken away for purposes of illustration.

Figure 2 is a perspective view of one of the weighing receptacles, the front side of the receptacle being broken away for purposes of illustration.

Figure 3 is an enlarged fragmentary view of the container retaining and tripping hook and its relation to the rotor blades. Figure 4 illustrates a method of providing individual drives for the shakers.

Referring to the drawing in detail, the embodiment illustrated comprises a chute 1 from which a relatively large amount of material, such as cereal flakes, may be delivered to an elongated open end pan or shaker 2, which latter may be movably supported by means of links 3. In the present instance, the links 3 are shown as pivoted on the chute 1. The pan 2 is connected to a crank shaft 4 by means of a link 5, and the crank shaft is preferably constantly driven by means of a variable speed motor 6. It will be apparent, therefore, that the pan 2 will be operated as a shaker and a comparatively large continuous stream of flakes, such as indicated at 7, may be delivered to a suitable weighing receptacle associated with a first weighing unit or scale 9. In some cases it has been found that a more uniform stream of material is delivered if the shaker is operated with a sidewise vibratory movement instead of lengthwise as shown.

In the embodiment illustrated the weighing unit 9 comprises a base portion 10, having the usual weight pan on which a suitable predetermined weight 11 may be supported. It will be understood that any suitable weighing scales may be used, preferably of the balance type. The scale is provided with outwardly extending arms 12 and 13 on the outer ends of which is pivoted a weighing receptacle or scale pan 14 to receive the material to be weighed.

It will be obvious that when sufficient material is delivered in the receptacle 14 to balance the predetermined weight 11, the receptacle will move downwardly but will retain its vertical alignment. A fan-like rotor member 15 is transversely pivoted in the receptacle casing 14 and provided with radially disposed blades 16, two of which, in the position shown, form the bottom and one side of a receptacle chamber 17. The rotor 15 is normally retained in the position shown by means of a hook member 18 pivoted on the casing at 19 and having a downwardly extending portion normally engaged by the outer end of one of the blades 16. The hook member 18 is also provided with an upwardly extending hooked portion 20 normally positioned above and out of contact with a stop 21, which stop may be mounted on any convenient part of the frame as indicated in Fig. 2.

The pan casing 14 is also provided with a downwardly extending chute portion 22 from which flakes or other material delivered into the chamber 17 will be discharged when the rotor 15 is rotated. The rotor 15 is pivoted for free rotation in the casing 14 and is accurately balanced so that the accuracy of the weighing will not be disturbed with a change in position.

The delivery of a predetermined weight of flakes into chamber 17 will cause the pan 14 and its associated parts to move downwardly. The downward movement will cause the portion 20 of the hook 18 to strike the stop 21 and the rotor 15 will be quickly released from the hook. The weight of the flakes in the chamber 17 will cause the rotor 15 to move one-fourth of a revolution and an approximately predetermined weight of flakes will be discharged from the chute 22. After the blade 16 has been released from the hook 18 and the rotor 15 starts its movement, the immediate discharge of a portion of the flakes from the chamber 17 will relieve the weight in the pan and the entire pan will rise, and a consecutive blade 16 will engage the hook 18 when the rotor has moved ninety degrees.

The overhanging hook portion 20 is normally positioned somewhat above the stop 21 and out of contact therewith, whereby there will be no friction on any of these parts when the casing starts downwardly and the continued accurate operation of the weighing mechanism will not be interfered with.

The scales 10 may be any well-known quick-acting type and are usually provided with some means such as a weight which is normally added to the weight 11, and is so positioned that immediately the pan 14 starts downwardly, it will move quickly to a position to reduce the balancing effect of the weight 11. The material pan 14 will therefore quickly drop and the rotor be accordingly quickly released. The hook 18 acts as an escapement for the rotor 15.

The weighing unit 9 may be mounted on a suitable support 23 and a second weighing unit 9a may be similarly mounted and preferably immediately below the unit 9, whereby the material from the first unit may be delivered directly into the material pan of the second unit. The second weighing unit 9a is similar to, and may be identical with, the unit 9 and comprises a base 10a supporting a weight pan on which is positioned an accurately predetermined weight 11a. Arms 12a and 13a are provided for supporting the material pan 14a in which is the receptacle chamber 17a.

In the embodiment illustrated, this entire weighing unit is identical with the weighing unit 9 and it is believed that further description is unnecessary except to state that it is provided with a rotor 15a, a hook 18a and a stop member 21a.

It should be particularly noted that, while the embodiment illustrated, shows only two weighing devices or scales, any desired number may be used, preferably in series relation as shown, whereby an increasing amount-by-weight of material may be delivered from one to another.

A chute 24 is positioned to deliver material to an open end shaker pan 25 which latter is supported by means of links 26 and is connected to the crank shaft 4 by means of a link 27. The shaker pan 25 and associated parts are so constructed and arranged as to deliver a relatively small substantially constant stream of material into the receptacle chamber 17a.

The second weighing unit 9a is, of course, provided with a discharge chute 22a, and cartons or other suitable containers 28 may be consecutively positioned under the chute 22a to receive the material therefrom. These packages may be positioned by a suitable conveyor and may be moved directly to a sealing device.

In normal continuous operation of the embodiment illustrated, a comparatively large continuous stream of material 7 passes into the receptacle 17 of the first weighing unit. As soon as a predetermined weight of the material is in the receptacle 17, the downward movement of the pan causes an approximate predetermined weight of material to be discharged through the chute 22 into the receptacle 17a of the succeeding weighing unit, and the receptacle 17 of the first unit is again filled and the operation repeated. During the succeeding filling of the receptacle 17, the comparatively small stream of material 7a adds an extremely accurate predetermined weight to the material already in the second receptacle 17a and this accurately predetermined weight causes the discharge of the material into the carton 28.

It will be apparent that during the operation of the device cereal flakes or other material are not crushed nor distorted from their natural shape and condition, and that the cartons 28 may be rapidly filled with very accurately weighed material.

As previously stated any desired number of weighing devices may be used and a corresponding number of progressively restricted streams of material may be delivered thereto. It is also desirable that means be provided whereby the size or flow of all of the streams of material may be varied simultaneously or individually. This may be accomplished by varying the speed of the motor 6 in the usual well known manner, which will vary the delivery of all of the shakers simultaneously, or a separate variable speed motor or other variable source of power may be provided for each shaker whereby the delivery of each shaker may be adjusted independently. Separate motors may be provided for the shakers 2 and 25 if desired. The motors are preferably provided with speed reducing mechanisms and may be connected for operation of individual shakers as illustrated in Fig. 4, or in any suitable manner.

It will, of course, be understood that a single power source may be used if desired, and the individual shakers may be connected thereto by well known adjustable mechanical connections whereby the relative movement of the various shakers may be adjusted to vary the individual flow.

Modifications may be made in the embodiment herein illustrated and described without departing from the spirit of the invention. It is therefore desired that the invention be limited only by the prior art and the scope of the appended claims.

Having thus described this invention, what is claimed and desired to be secured by Letters Patent is:

1. An automatic weighing assembly comprising a plurality of independently operable weight responsive units in series relation, each unit being of the multichamber type and adapted during the discharge of a chamber filled to predetermined weight to present another chamber for resumption of the weighing cycle, said units being constructed and arranged to serially advance a progressively increasing weight of material, and means for delivering continuous streams of material to each unit to progressively increase the weight advanced by consecutive units, the first stream being of comparatively large volume flow, and each succeeding stream being of materially less volume than the first stream.

2. In an automatic weighing machine of the character described, a weighing balance having a receptacle downwardly movable in response to a predetermined weight of material deposited therein, said receptacle comprising a casing, a rotary means in said casing and forming material receiving compartments by step-by-step rotary movement during weighing operations, a detent for restraining said rotary means at each step, and a stop member normally out of engagement with said detent and constructed and arranged to be engaged by said detent during each downward movement of said receptacle to release said rotary member and enable a one-step movement of said rotary means.

3. In an automatic continuous operable weighing machine of the character described, a balance having a receptacle casing, a rotor in said casing and movable step-by-step during weighing operations to consecutively form substantially rectangular receptacles, said casing being formed to enable the discharge of material therefrom during downward movement of said rotor in response to material deposited thereon, a detent on said casing and normally engaging said rotor to prevent rotary movement thereof, a stop member positioned normally out of engagement with said detent and adapted to be engaged thereby during the downward movement of said casing and to thereby release said rotor for a one-step movement.

4. In an automatic weighing assembly for continually weighing and segregating predetermined weights of material continuously supplied thereto, means for causing said continuous flow, means for continually segregating by weight amounts of said continuously flowing material without interrupting said continuous flow, each segregated amount weighing slightly less than a predetermined weight, continuous flow means for adding to each segregated amount an additional amount of material from said continuous flow to complete said predetermined weight, and means for successively discharging said predetermined weights of material.

5. In an automatic weighing assembly for continually weighing and segregating predetermined weights of material continuously supplied thereto, means for causing said continuous flow, means for continually segregating by weight amounts of said continuously flowing material without interrupting said continuous flow, each amount weighing slightly less than a predetermined weight, continuous flow means for adding to said segregated amount an additional amount of material from said continuous flow to complete said predetermined weight, means for successively discharging said predetermined weights of material, and means for simultaneously varying the rate of all continuous flow.

6. In an automatic continuous feed weighing machine, the combination with a plurality of independently operable weight responsive units of the multi-receptacle type, said units being arranged to discharge from one to another progressively, each unit having means operable only by the weight of the material therein for discharging material from one unit to another, of means independent of said weight responsive receptacles for delivering a different continuous volume flow of material to each receptacle.

7. An automatic weighing device comprising a plurality of consecutively positioned weighing receptacles for receiving continuously flowing streams of material to be weighed, rotary means in each receptacle forming consecutive material-receiving compartments within said receptacles therewithin, by step-by-step rotary movement therewithin, said receptacles being arranged for independent downward movement in response to predetermined weights of material deposited in said compartments and being arranged to discharge said predetermined weights of material upon rotation of said rotary means, a detent associated with each receptacle normally preventing rotation of said rotary means, a stop member associated with each detent adapted to be engaged thereby during downward movement of said receptacles to release the associated rotary means for one-step movement, means for flowing a continuous stream of material to one of said receptacles, said receptacle being arranged consecutively to discharge weights of material less than a desired weight into a second one of said receptacles, and means for flowing a continuous stream of material into said second receptacle to augment the weight of material supplied thereto from said first receptacle, said second receptacle being arranged consecutively to discharge said desired weights of material therefrom.

8. A continuous feed weighing assembly comprising a multi-receptacle scale mechanism responsive only to a predetermined weight of material supplied thereto, a second multi-receptacle scale mechanism responsive only to a greater predetermined weight, means independent of the weight response of said multi-receptacle scale mechanisms for continuously supplying a continuous flow of material to said first multi-receptacle scale mechanism, means operatively related to the response of said first multi-receptacle scale mechanism to deliver an approximate weight of material from said first multi-receptacle scale mechanism to said second multi-receptacle scale mechanism, means independent of the weight response of said second multi-receptacle scale mechanism for continuously supplying additional material to said second multi-receptacle scale mechanism in a continuous stream of small volume flow, and means operatively related to the response of said second multi-receptacle scale mechanism to deliver a substantially accurate predetermined weight of material therefrom.

9. In weighing apparatus a plurality of weighing means arranged in series and adapted to advance a weighed batch from one to the other to segregate by increments a predetermined unit weight of material, said weighing means being of the type that upon completion of one weighed increment, weighing of a succeeding increment may be resumed during discharge of the preceding batch, without requiring curtailment of the feed supply thereto, means associated with each scale mechanism for effecting advance of the weighed batch upon reaching a pre-selected weight, and means for supplying to said weighing means a plurality of continuous streams of different volume flow.

JOHN L. FERGUSON.